United States Patent Office

3,552,240
Patented Jan. 5, 1971

3,552,240
WORK SUPPORT FOR MULTI-STATION MACHINE TOOLS
Kurt Wüsteney, Dutzen uber Minden, and Otto Lehmann, Sennestadt, Germany, assignors to Werkzeugmaschinenfabrik Gildemeister & Comp. Akt-Ges., Bielefeld, Germany
Filed July 2, 1968, Ser. No. 742,063
Claims priority, application Germany, July 21, 1967, 1,627,036
Int. Cl. B23b *39/20;* B23g *3/00;* B23p *23/02*
U.S. Cl. 77—64                                17 Claims

ABSTRACT OF THE DISCLOSURE

A work support for use in double-end or opposed-head machine tools comprises an indexible shaft 1 which carries a turret composed of several housings 4 each of which accommodates a pair of coaxial work holders 5, 6 movable toward and away from each other by a drive including two pairs of pistons 21, 22. The work holders are rotatable in their housings to change the orientation of workpieces, and one holder 6 of each pair can be rotated between several angular positions by a piston-operated rack and pinion drive 9, 10. A locking device 13–17 can fix the holder 6 in each angular position. The movements of pistons in each drive are synchronized (by 21', 24, 25) to insure simultaneous movement of the respective pairs of holders in opposite directions and through identical distances.

CROSS-REFERENCE TO RELATED CASES

The work support of the present invention constitutes an improvement over and a further development of work supports which are disclosed in our Letters Patent No. 3,385,138, granted May 28, 1968, and in our copending application Ser. No. 513,709, filed Dec. 14, 1965 and now abandoned.

BACKGROUND OF THE INVENTION

The present invention relates to work suports for use in machine tools, and more particularly to improvements in indexible work supports which serve to hold workpieces against movement during treatment by one or more turning, boring, milling and/or other types of tools, for example in opposed-head or double-end machines. Still more particularly, the invention relates to improvements in work supports which are designed to change the orientation of workpieces without necessitating even temporary disengagement of workpieces from their holders.

In machining of certain classes or workpieces, especially in treatment of universal joints, T's, cross connections and like parts having several axes which lie in a common plane or cross each other in space, the workpieces are normally gripped by chucks which can be rotated to change the orientation of workpieces so that a workpiece can be subjected to several treatments without separation from the chuck. Thus, the chuck must be capable of moving a workpiece between two or more angular positions in each of which different surfaces or portions of the workpiece are in requisite position for engagement by one or more tools. The just described tool supports are presently employed in certain types of lathes.

It is also known to hold a workpiece between two coaxial chucks one of which is fixed against axial movement and the other of which is movable by a coaxial piston. Such work supports are unsatisfactory for gripping of cylindrical, spherical or other rotary workpieces because a workpiece whose dimensions deviate from a norm is not centered between the chucks so that the removal of material results in an unbalanced article. There is no provision to automatically lock the reciprocable chuck in operative position, i.e., the workpiece is likely to be disengaged in response to sudden increase in cutting force or on failure of the system which regulates the flow of fluid to and from the cylinder for the piston. Furthermore, the means for rotating the chucks of conventional work supports are too bulky, too complicated, too expensive and/or inaccurate. Therefore, such types of supports failed to gain acceptance by the manufacturers of opposed-head machine tools.

SUMMARY OF THE INVENTION

It is an object of our invention to provide a novel and improved work support which can be used with particular advantage in opposed-head or double-end machine tools or in analogous machines wherein complicated workpieces which require a series of treatments in different orientations are at a standstill during engagement with one or more tools.

Another object of the invention is to provide a work support wherein the work holders are capable of accurately centering workpieces whose dimensions deviate from a predetermined norm and wherein the workpieces are properly held against ejection by centrifugal force or by unexpected forces which might arise during engagement with tools, even if the power system which moves the holders with reference to each other happens to become defective in the course of a working cycle.

A further object of the invention is to provide a support which can clamp and change the orientation of several workpieces and wherein the changes in orientation of workpieces are carried out with a high degree of accuracy and without affecting the retaining action of holders which support the workpieces during treatment and during movement between two or more working stations.

An additional object of the invention is to provide a work support wherein the force with which the workpieces are held during treatment and/or during indexing and reorientation can be regulated, and wherein the movements of parts which grip, reorient, index, lock and release the workpieces can be programmed to take place in a predetermined sequence.

The improved work support is particularly suited for holding and manipulation of workpieces which are at a standstill during treatment, especially for holding and manipulation of workpieces which are treated by tools mounted in an opposed-head machine tool. It comprises at least one pair of coaxial work holders which are reciprocable toward and away from each other to respectively engage and release a workpiece which is placed between their jaws, support means which preferably comprises a substantially V-shaped housing mounted on an indexible shaft and defining a recess into which the jaws of the holders extend, drive means for the holders including one or more pairs of fluid-operated cylinders mounted on or in the support means and pistons movable in the cylinders and each operatively connected to one of the holders, preferably by a self-locking connection including a groove in the respective holder and a wedge like motion transmitting member of the piston, and synchronizing means for synchronizing the movements of pistons to effect simultaneous movements of holders in opposite directions and through identical distances in response to movement of pistons with reference to their cylinders.

The means for changing the orientation of workpieces comprises a pivoting device which can rotate one of the holders between several angular positions whereby the one holder rotates the other holder through the intermediary of the workpiece. The means for locking the one holder in each angular position preferably comprises a piston which carries a cam serving to move a follower into engagement with one of several facets or flats on the one holder.

The novel features which are considered as characteristic of the invention are set forth in particular in the appended claims. The improved work support itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENT

Figure 1:
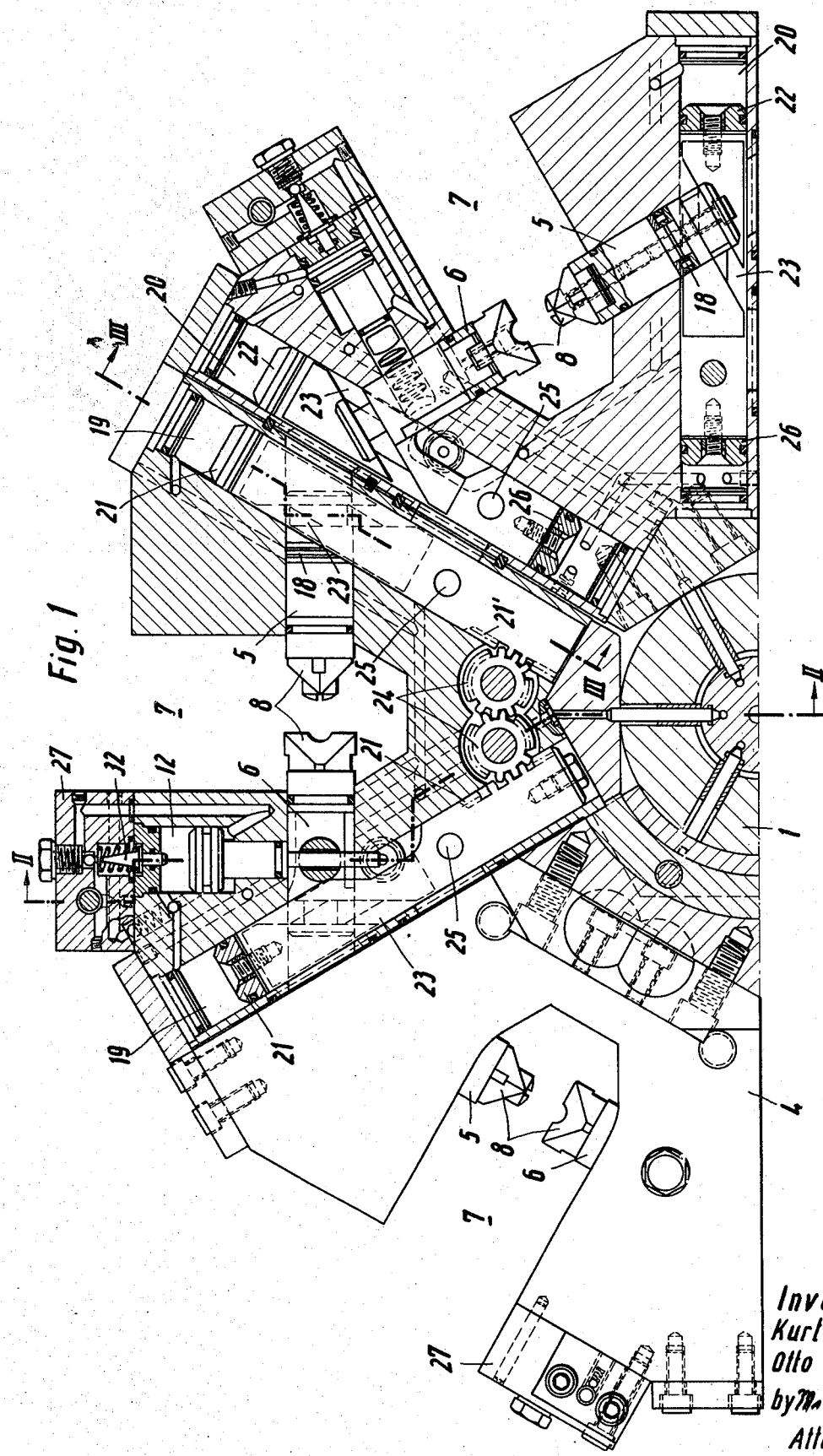
FIG. 1 is a fragmentary partly elevational and partly sectional view of a work support which embodies the invention.
Figure 2:
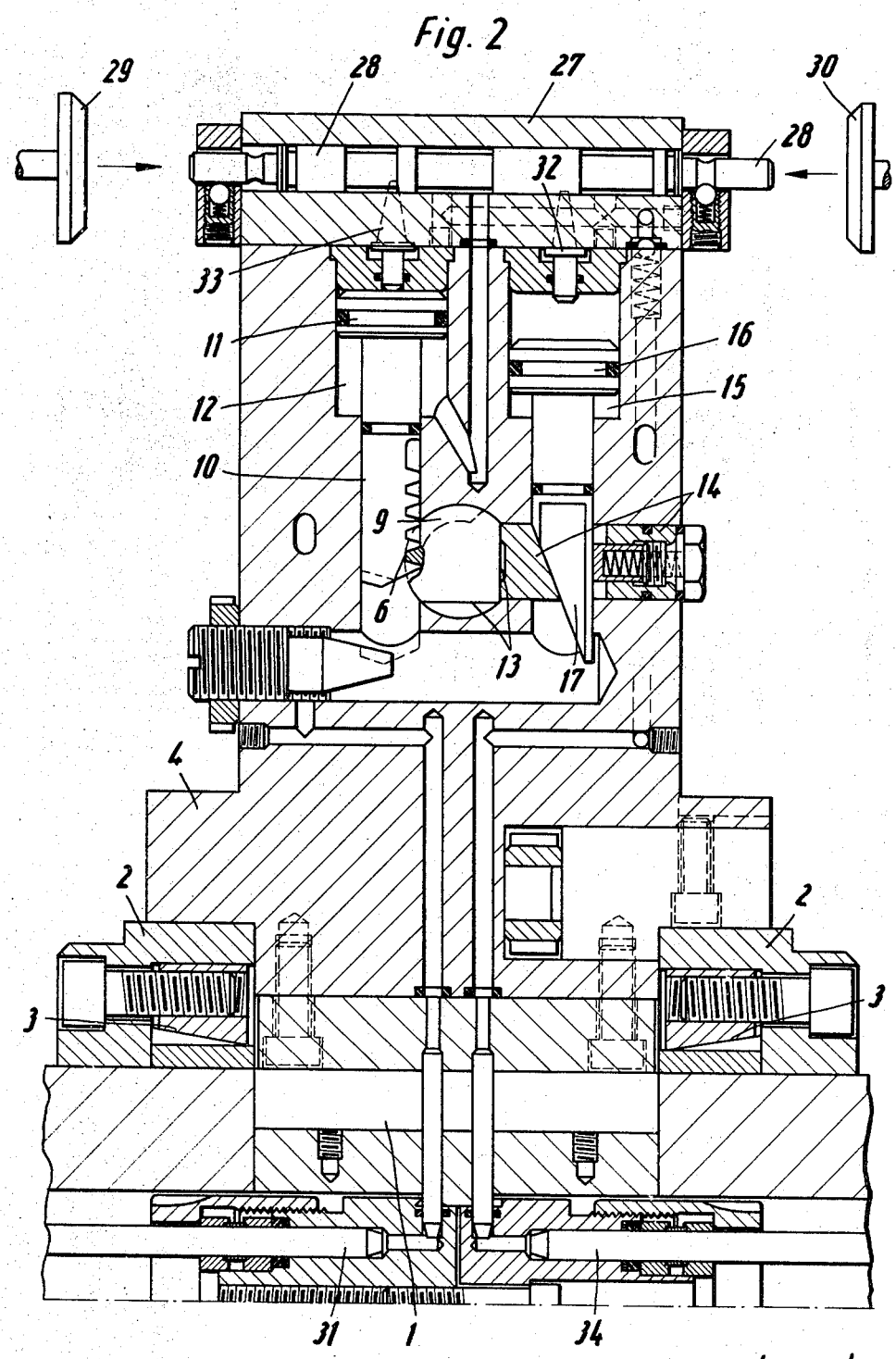
FIG. 2 is a fragmentary transverse sectional view of the work support as seen in the direction of arrows from the line II—II of FIG. 1.
Figure 3:
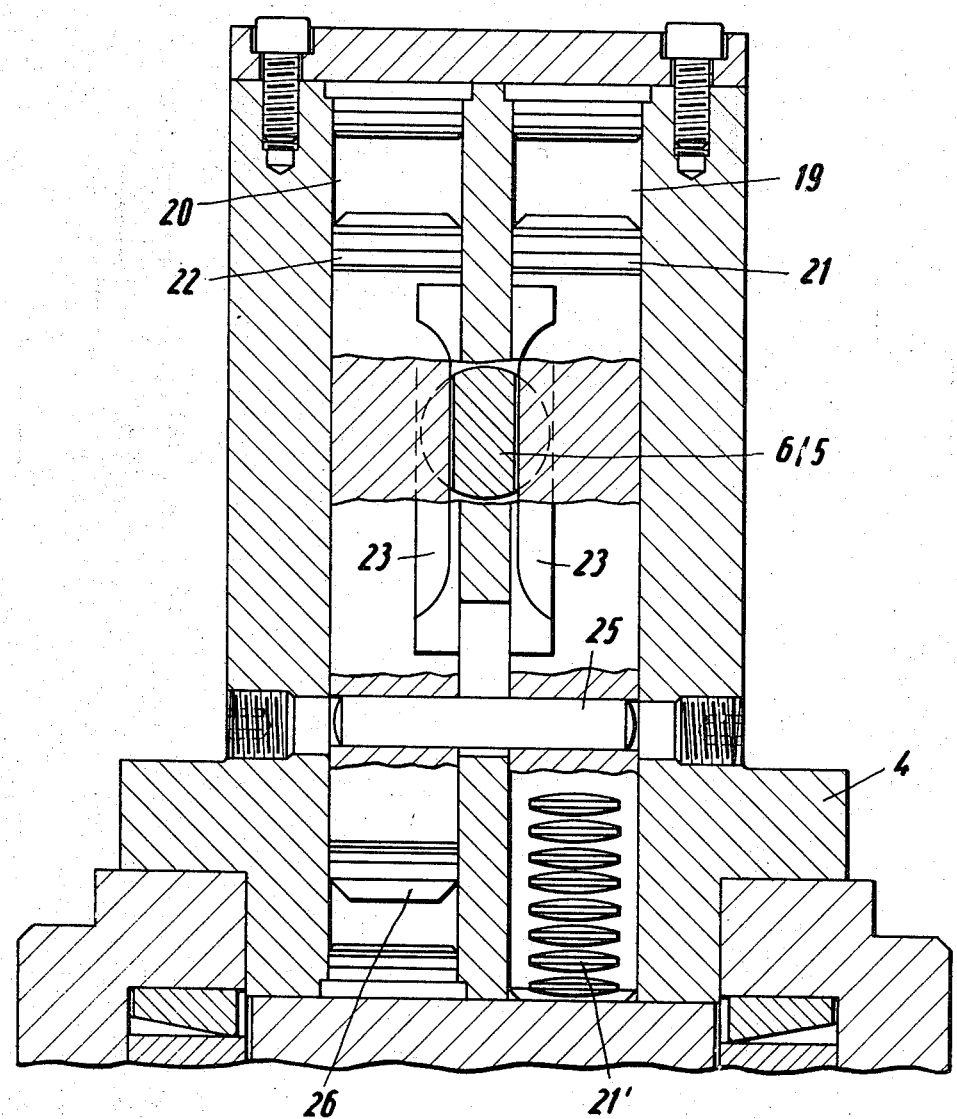
FIG. 3 is a fragmentary transverse sectional view as seen in the direction of arrows from the line III—III of FIG. 1.

The work support of FIGS. 1 to 3 may be utilized in opposed-head or double-end machine tools of the character illustrated in FIG. 1 of our aforementioned copending application Ser. No. 513,709. It comprises a hollow shaft 1 which is indexible about a horizontal axis and carries two disks 2 of hexagonal outline which are secured thereto by locking rings 3 in a manner disclosed in our aforesaid Pat. No. 3,385,138. The disks 2 engage with and hold six substantially V-shaped housings or supports 4 which together form a turret adapted to support six workpieces at a time.

Each housing 4 is provided with a recess 7 which extends radially of the shaft 1 and accommodates the work-engaging portions or jaws 8 of two coaxial work holders 5, 6. The holders 5, 6 are movable toward and away from each other in order to respectively engage with and be disengaged from a workpiece which is introduced into the respective recess 7 into the space between the jaws 8. The holder 6 is rotatable back and forth between several angular positions so that it can change the orientation of a workpiece. The means for turning the holder 6 about its axis comprises a pinion 9 (shown in FIG. 2 as a gear segment) which is rigid with the holder 6, a straight toothed rack 10 which meshes with the pinion 9 and is reciprocable in the housing 4, and a fluid-operated device which reciprocates the rack with reference to the housing. This device comprises a piston 11 which is rigid with the rack 10 and a cylinder 12 which is provided in the housing 4 and is of the double-acting type so that the pressure of fluid admitted into one of the two chambers of the cylinder 12 can effect axial movement of the rack 10 in a sense to change the angular position of the holder 6 by substantially 90 degrees. It will be noted that the means for turning the holder 6 is fully accommodated in the respective housing 4. The axis of the cylinder 12 is normal to the axis of the holder 6.

Each housing 4 further accommodates a means for locking the respective work holder 6 in one of two angular positions. Such locking means comprises two facets or flats 13 provided on a portion of the holder 6 and making an angle of 90 degrees with each other (see FIG. 2), a spring-biased plunger or follower 14 which is reciprocable in the housing 4 at right angles to the axis of the holder 6 and can move into face-to-face abutment with one of the flats 13, a spring which biases the follower 14 away from the holder 6, a wedgelike cam 17 which can engage a suitably inclined face of the follower 14 to move the latter against the adjoining flat 13, and a fluid-operated device for reciprocating the cam 17. The latter device comprises a piston 16 having a piston rod which is rigid with the cam 17 and a double-acting cylinder 15 which is provided in the housing 4 and accommodates the piston 16. When the piston 16 moves the cam 17 upwardly, as viewed in FIG. 2, the aforementioned spring pulls the follower 14 away from the adjoining flat 13 so that the holder 6 can change its angular position in response to lengthwise displacement of the rack 10.

The work support does not comprise any means for positively engaging with and rotating the work holders 5 about their axes. The inner end portion of each work holder 5 bears against a thrust bearing 18 (FIG. 1) which enables it to share angular movements of the associated work holder 6 when the latter is rotated by the respective rack 10. The transmission of rotary motion from the holder 6 to the holder 5 takes place by way of the workpiece which is clamped between the respective jaws 8.

The drive means for reciprocating the holders 5, 6 toward and away from each other comprises two pairs of fluid-operated cylinder and piston assemblies, and each such pair comprises two cylinders 19, 20 and two pistons 21, 22. Each of these cylinders makes an acute angle with the respective holder 5 or 6 and the plane including one pair of cylinders 19, 20 makes an acute angle with the plane of the other pair of cylinders 19, 20. The pistons 21, 22 are provided with inclined motion transmitting strips 23 which extend into circumferential grooves of the respective holders and serve to move the holders 5, 6 at the rate of one-to-two with reference to the extent of movement of pistons 21, 22. The arrangement is such pair comprises two cylinders 19, 20 and two pistons 5 and 6 outwardly, i.e., into the corresponding recess 7, when the pistons advance toward the shaft 1, and that the holders 5, 6 are retracted when the pistons 21, 22 perform a return or outward stroke. Each cylinder 19 is of the single-acting type, i.e., each such cylinder can receive fluid in a sense to move the respective piston 21 radially inwardly and to thereby move the jaw 8 of the holder 5 or 6 toward the associated jaw 8 of the holder 6 or 5. The cylinders 20 are of the double-acting type and, therefore, each of their pistons 22 is rigid with a return piston or disengaging piston 26 which moves radially of and away from the shaft 1 when the inner chamber of the respective cylinder 20 receives pressurized fluid.

In order to synchronize the movements of all pistons 21, 22, 26 in a common housing or support 4, the pistons 21 are provided with straight toothed racks 21' which extend toward the shaft 1 and each of which meshes with one of a pair of mating gears or gear segments 24 mounted in the housing 4 adjacent to the deepmost zone of the recess 7. Bolts 25 are employed (see particularly FIG. 3) to couple each piston 21 to the adjoining piston 22. These bolts 25, together with the racks 21' and pinions 24, constitute a synchronizing means serving to insure that the holders 5, 6 move simultaneously at the same speed and to the same extent, either toward or away from each other, when the pistons 21, 22, 26 are caused to move lengthwise of their cylinders.

When the holders 5, 6 move toward each other, pressurized fluid acts against the end faces of four pistons, namely, against two pistons 21 and two pistons 22. When the holders 5, 6 move away from each other, the fluid exerts pressure against two pistons 26. Since the cross-sectional areas of the cylinders 19, 20 are preferably identical, the force applied to retract the holders 5, 6 is half the force which is applied during movement of holders into engagement with a workpiece. It will be noted that the cylinders 19, 20 extend substantially radially of the shaft 1 and that each bolt 25 couples a piston 21 with a parallel piston 22. One pair of cylinders 19, 20 in each housing 4 makes with the other pair of cylinders 19, 20 an angle of 60 degrees.

The hydraulic control system which regulates the flow of fluid to and from the cylinders 12, 15, 19 and 20 comprises slide valves 27 one of which is mounted on each housing 4 outwardly adjacent to the cylinder 12 and has a reciprocable valve member or spool 28 whose axis is parallel to the axis of the shaft 1. When the spool 28 is moved axially to a first end position (shown in FIG. 2), the holder 6 is ready to pivot in a counterclockwise direction and the control system also effects a movement of holders 5, 6 toward and away from each other. When the spool 28 is moved to its left-hand end position, the holder 6 is ready to be pivoted in a clockwise direction, as viewed in FIG. 2. The means for moving the spool 28 axially comprises two hydraulically operated pushers 29, 30 whose movements are controlled by limit switches (not shown) actuatable by cams mounted on the shaft 1 through the intermediary of gear trains or the like.

It is now assumed that the spool 28 of FIG. 2 dwells in the illustrated right-hand end position. The operator then actuates a foot pedal (or the programming unit of the machine tool produces a signal) to admit pressurized fluid by way of a passage 31 in the shaft 1. Such fluid (e.g., oil) flows into the inner chamber of the cylinder 15 to move the piston 16 and the cam 17 radially outwardly whereby the follower 14 moves away from the adjoining flat 13 under the action of its spring so that the holder 6 is free to turn about its axis. Shortly before the cam 17 reaches its outer end position, the piston 16 actuates a spring-biased valve 32 which admits fluid into the outer chamber of the cylinder 12 so that the piston 11 moves the rack 10 radially inwardly in order to turn the holder 6 in a counterclockwise direction and to thereby place the other flat 13 into registry with the retracted plunger 14. The jaws 8 of the holders 5, 6 are assumed to grip a workpiece (not shown) so that the holder 6 rotates the holder 5 through the intermediary of the workpiece. As stated before, the holder 5 can turn on a thrust bearing 18.

The piston 11 actuates a further valve 33 which admits fluid to the inner chambers of cylinders 20 so that such fluid acts on the pistons 26 and causes the pistons 21, 22 to move radially outwardly, i.e., the holders 5, 6 are caused to move away from each other and to release the finished workpiece. The latter can be taken over by a suitable transfer device (not shown) or is removed by hand. In the next step, a fresh workpiece is placed between the jaws 8, and the programming unit (or the person in charge) produces a signal to move the holders 5, 6 toward each other. This is achieved by admitting pressurized fluid by way of a passage 34 in the shaft 1. The piston 11 is blocked by pressurized fluid and remains in the inner end position. The piston 16 is caused to move radially inwardly so that the follower 14 bears against the adjoining flat 13 with a relatively weak force and prevents rotation of the holder 6 after the jaws 8 engage the fresh workpiece.

In order to pivot a partly finished workpiece to a different angular position, the pusher 30 moves the spool 28 to the left-hand end position. When the operator (or the programming unit) thereupon admits fluid by way of the passage 31, the valve 27 admits such fluid into the inner chamber of the cylinder 15 to disengage the follower 14 from the holder 6. The piston 16 actuates the valve 32 whereby the valve 27 (in the left-hand end position of its valve member 28) admits fluid to the inner chamber of the cylinder 12 and causes the rack 10 to move radially outwardly so as to turn the holder 6 in a clockwise direction, i.e., back to the position shown in FIG. 2, whereby the holder 6 turns the workpiece and the associated holder 5. The control system can temporarily terminate the clamping pressure during turning of the holders 5, 6 with a partly finished workpiece therebetween. Such temporary interruption of clamping pressure (against the pistons 21, 22) does not result in movement of holders 5, 6 away from each other, as long as no fluid is admitted into the inner chambers of cylinders 20 to act against the pistons 26. Thus, the jaws 8 then grip the workpiece solely as a result of the mechanical self-locking action between the holders 5, 6 and pistons 21, 22. Such self-locking action takes place and prevents undesired axial movements of holders 5, 6 whenever the chambers of cylinders 19, 20 are sealed from the source of pressurized fluid.

An important advantage of the improved work support is that the holders 5, 6 of each housing 4 are movable simultaneously toward and away from each other and that such holders move to the same extent. This insures that inaccuracies in dimensioning of tank workpieces do not affect the accuracy of treatment to which the workpieces are subjected while being held by the holders. For example, and if the jaws 3 of a pair of coaxial holders 5, 6 grip a cylindrical workpiece whose diameter exceeds a predetemined average diameter, the workpiece is properly centered by the holders because each of the holders moves at the same rate. Were one of the holders fixed against axial movement, inaccuracies in the dimensioning of a freshly inserted workpiece would cause inaccuracies in treatment to which the workpiece is subjected while being held by the jaws. The improved work support eliminates the danger of producing unbalanced rotary workpieces.

Another important advantage of the work support is that a drop in fluid pressure cannot automatically result in ejection or release of a workpiece which is gripped by the jaws 8. This is due to the aforediscussed self-locking action between the holders 5, 6 and the corresponding pairs of pistons 21, 22.

It is clear that the number of housings in our improved work support can be changed without departing from the spirit of the invention. Also, the recesses 7 may but need not be equidistant from each other. Furthermore, each holder 6 can be provided with three or more flats 13 so that each such holder can move to and dwell in three or more different angular positions. The number of flats depends on the nature of workpieces and/or on the nature of treatments to which the workpieces may be subjected by tools which are mounted in opposed heads of the machine tool. As a rule, each workpiece can be treated simultaneously by two tools each of which is carried by one of the heads. Therefore, the holders 5, 6 should be capable of locating each workpiece in at least two different positions in each of which two different surfaces, or two different portions of a workpiece are ready to be engaged by discrete tools. The axes of tools carried by one of the heads may but need not be parallel to or aligned with the axes of tools on the other head. In other words, a tool carried by one of the heads can drill a first hole in a first surface of a workpiece between a pair of jaws while a tool carried by the other head drills a hole into another surface of the workpiece whereby the second hole need not be parallel to or coaxial with the first hole. Also, the second surface need not be parallel to the first surface.

The manner in which the turret including the housings 4 is indexed to move successive workpieces into registry with successive groups of tools in the machine tool is known and forms no part of the present invention. In the illustrated embodiment, each workpiece can be subjected to as many as twelve different treatments. The manner in which the passages of the shaft 1 can be connected to or sealed from a source of pressurized fluid is known in the art and need not be described here. As stated before, the signals for admission of fluid by way of passages 31, 34 can be furnished by the operator or by a programming unit. The latter solution is preferred when the machine tool includes automatic devices for feeding fresh workpieces to and/or for removing finished workpieces from the recesses 7. Finally, it is to be noted that at least one of each pair of pushers 29, 30 can be replaced by a stationary or mobile cam.

Opposed head machines of the type which can utilize the work support of our present invention are disclosed, for example in German Patent No. 1,205,795.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claim:

1. In a support for workpieces which are at standstill during treatment, particularly for work pieces which are treated by tools mounted in an opposed-head machine, a combination comprising a pair of coaxial work holders reciprocable axially toward and away from each other to respectively engage and release a workpiece therebetween, said holders being also turnable about their axes to change the angular position of an engaged workpiece; support means for said holder; drive means for reciprocating said holders; synchronizing means cooperating with said drive means to effect simultaneous movements of said holders in opposite directions through identical distances in response to movement of said drive means; and turning means for rotating one of said holders between a plurality of angular positions.

2. A combination as defined in claim 1, wherein said drive means comprises a pair of fluid-operated cylinders on said support means and pistons movable in said cylinders and each operatively connected to one of said holders, and wherein said synchronizing means synchronize the movements of said pistons.

3. A combination as defined in claim 1, wherein said drive means comprise a pair of fluid-operated cylinders, and including a regulating valve for regulating the flow of fluid to and from said cylinders.

4. A combination as defined in claim 2, wherein at least one of said cylinders is a double-acting cylinder so that the respective piston is movable in two directions to effect movements of said holders toward or away from each other.

5. A combination as defined in claim 2, wherein the axes of said cylinders are inclined with reference to each other and with reference to the axes of said holders.

6. A combination as defined in claim 3, wherein the operative connection between each piston and the respective holder comprises a self-locking motion transmitting device.

7. A combination as defined in claim 1, wherein said turning means for rotating one of said holders between a plurality of angular positions comprises a fluid-operated cylinder on said support means.

8. A combination as defined in claim 5, further comprising locking means for locking said one holder in each of said angular positions, including a fluid-operated cylinder on said support means.

9. A combination as defined in claim 2, wherein said drive means comprises a second pair of cylinders and an additional piston in each of said last mentioned cylinders, each of said additional pistons being operatively connected to one of said holders and said synchronizing means comprising means for coupling each additional piston to one of said first mentioned pistons, each cylinder of said second pair being parallel with a cylinder of said first mentioned pair.

10. A combination as defined in claim 9, wherein two of said cylinders are double-acting cylinders so that the respective pistons are movable in two directions to effect movements of said holders toward and away from each other.

11. A combination as defined in claim 2, wherein said synchronizing means comprises a toothed rack rigid with each of said pistons and a pair of mating gears rotatably mounted in said support means and each meshing with one of said racks.

12. A combination as defined in claim 1, wherein said turning means for rotating one of said holders between several angular positions includes a cylinder on said support means, and locking means for locking said one holder in each of said angular positions, including a cylinder on said support means, the cylinders of said turning and locking means being disposed at right angles to said one holder.

13. A combination as defined in claim 12, wherein said turning means further comprises a gear rigid with said one holder, a piston reciprocable in the cylinder of said turning means, and a rack connected to said last mentioned piston and meshing with said gear.

14. A combination as defined in claim 12, wherein said locking means further comprises mutually inclined facets provided on said one holder, a piston reciprocably received in the cylinder of said locking means, and a follower movable by said last mentioned piston into engagement with one of said facets at a time.

15. A combination as defined in claim 14, wherein said locking means further comprises cam means provided on said last mentioned piston and arranged to shift said follower against said one facet on movement of said last mentioned piston in a predetermined direction, and means for biasing said follower away from said one holder.

16. A combination as defined in claim 3, wherein said support means is provided with passages connecting the cylinder of said locking means with the cylinders of said drive means.

17. A combination as defined in claim 3, further comprising an indexible shaft connected with said support means, said regulating valve comprising a valve member movable in parallelism with said shaft.

References Cited
UNITED STATES PATENTS 3,385,138   5/1968   Wusteney et al.   77—64

FRANCIS S. HUSAR, Primary Examiner

U.S. Cl. X.R.

29—38; 269—63